United States Patent [19]

Baskin et al.

[11] Patent Number: 4,565,929
[45] Date of Patent: Jan. 21, 1986

[54] WIND POWERED SYSTEM FOR GENERATING ELECTRICITY

[75] Inventors: Joseph M. Baskin, Mercer Island; Gary E. Miller, Tukwila; Wayne Wiesner, Kent, all of Wash.

[73] Assignee: The Boeing Company, Seattle, Wash.

[21] Appl. No.: 537,750

[22] Filed: Sep. 29, 1983

[51] Int. Cl.[4] .............................................. F03D 1/06
[52] U.S. Cl. ....................................... 290/44; 290/55
[58] Field of Search ................. 290/44, 55; 416/50 A, 416/51 A, 52 A, 53, 169 B, 32, DIG. 2

[56] References Cited

U.S. PATENT DOCUMENTS

| | | | |
|---|---|---|---|
| 1,746,991 | 2/1930 | Bucklen . | |
| 2,058,500 | 10/1936 | Plucker | 290/55 |
| 2,086,279 | 7/1937 | McDonald, Jr. | 290/44 |
| 2,106,557 | 1/1938 | Putnam | 290/44 |
| 2,148,804 | 2/1939 | Claytor | 290/44 |
| 2,148,921 | 2/1939 | Allen | 416/23 |
| 2,178,047 | 10/1939 | Malme | 290/44 |
| 2,178,679 | 11/1939 | Claytor | 290/44 |
| 2,207,200 | 7/1940 | Hoffman | 416/241 |
| 2,236,494 | 3/1941 | Albers | 416/223 R |
| 2,339,749 | 1/1944 | Albers | 290/44 |
| 2,484,197 | 10/1949 | Veldhuis | 290/44 |
| 2,485,543 | 10/1949 | Andreau | 416/142 B X |
| 2,622,686 | 12/1952 | Cheureau et al. | 416/23 |
| 3,597,108 | 8/1971 | Mercer et al. | 416/139 |
| 4,025,230 | 5/1977 | Kastan | 416/18 |
| 4,039,848 | 8/1977 | Winderl | 290/55 |
| 4,059,771 | 11/1977 | Jacobs et al. | 290/44 |
| 4,095,120 | 6/1978 | Moran et al. | 290/44 |
| 4,146,264 | 3/1979 | Korzeniewski | 290/44 |
| 4,171,929 | 10/1979 | Allison | 416/226 |
| 4,228,391 | 10/1980 | Owen | 322/35 |
| 4,297,076 | 10/1981 | Donham et al. | 416/37 |
| 4,355,955 | 10/1982 | Kisovec | 416/23 |
| 4,357,542 | 11/1982 | Kirschbaum | 290/44 |
| 4,389,162 | 6/1983 | Doellinger et al. | 416/225 |
| 4,392,781 | 7/1983 | Mouille et al. | 416/223 R |
| 4,435,646 | 3/1984 | Coleman et al. | 290/55 |

FOREIGN PATENT DOCUMENTS

| | | | |
|---|---|---|---|
| 456963 | 5/1949 | Canada | 416/132 B |
| 908631 | 4/1946 | France | 416/132 B |
| 61508 | 5/1955 | France | 416/41 A |
| 2288877 | 10/1974 | France . | |

OTHER PUBLICATIONS

Park, The Wind Power Book, 9-1982, pp. 220-225.
Jayadev, Windmills Stage a Comeback; IEEE Spectrum, 11-1976, pp. 45-49.

Primary Examiner—William M. Shoop, Jr.
Assistant Examiner—W. Duncanson
Attorney, Agent, or Firm—Delbert J. Barnard

[57] ABSTRACT

A fixed pitch wind turbine rotor (18) is teeter mounted (76, 78, 80) onto a low speed input shaft (44) which is connected to the input (58) of a step-up transmission (46). The output (48) of the transmission (46) is connected to a rotary pole amplitude modulated induction machine (42) which is operable as a generator at a plurality of discreet speeds of rotation and is also operable as a startup motor for the rotor. A switch (45) responsive to the rotational speed of the wind turbine rotor switches the generator from one speed of operation to the other. The rotor hub (72) and the inner body portions (71) of two blades (68, 70), which extend radially outwardly in opposite directions from the hub (72), are constructed from steel. The outer end portions (73) of the blade (68, 70) are constructed from a lighter material, such as wood, and are both thinner and narrower than the remainder of the rotor. The outer end section (73) of each blade (68, 70) includes a main body portion and a trailing edge portion (104) which is hinge-connected to the main body portion. Each blade (68, 70) includes a centrifugal force operated positioning means (98, 100) which normally holds the drag brake section (104) in a retracted position, but operates in response to a predetermined magnitude of centrifugal force to move the drag brake (104) section into its deployed position. Each blade has an airfoil cross section and each blade (68, 70) has a plus twist inner portion adjacent the hub (72) changing to first a zero twist and then a minus twist as it extends radially outwardly from the hub (72).

18 Claims, 26 Drawing Figures

WIND POWERED SYSTEM FOR GENERATING ELECTRICITY

TECHNICAL FIELD

This invention relates to wind powdered systems for generating electricity, and in particular to large wind turbine systems sized to generate electricity for utilities.

BACKGROUND ART

A history of the development of wind energy is presented by the publication entitled, "Wind Energy Developments In The Twentieth Century", published by the Lewis Research Center of the National Aeronautics and Space Administration, Cleveland, Ohio, in 1979. A predecessor to the subject wind turbine system, termed the "Mod-2 Wind Turbine", is described both in that publication and in another publication simply entitled, "Mod-2", published by the Bonneville Power Administration, U.S. Department of Energy.

The "Mod-2" wind turbine system comprises a 300 ft. diameter turbine rotor composed of two variable pitch blades. The first Mod-2 generator was incorporated into the Bonneville Power Administration grid in early 1981. Since that time, two additional Mod-2 generators have been incorporated into the grid.

A fixed pitch wind turbine rotor offers a simplification and lower cost over that of a controllable blade pitch wind turbine rotor. However, a fixed pitch rotor is harder to start because the blade pitch for efficient operation is different from that for good starting. A proposed solution to this problem is to use the generator that is driven by a wind turbine rotor as a motor during startup to bring the wind turbine rotor up to operating speed. This concept is proposed in U.S. Pat. No. 4,228,391, granted Oct. 14, 1980, to Witney H. Owen, in conjunction with the use of an induction machine having two sets of windings.

A fixed pitch turbine rotor is designed to stall in high winds, to limit rotor torque. Therefore, the electrical generator and drive system have to be large and strong enough to take the maximum torque that the rotor can generate. Thus, the generator must not only act as a starter but must be capable of absorbing the maximum power output of the rotor. The rotor in turn must have the capability to not critically overspeed in the event the load is for some reason removed from it. One proposed way of limiting the rotational speed of a wind turbine rotor is to provide the rotor with a centrifugal force operated drag brake. This concept is disclosed by U.S. Pat. No. 2,058,500, granted Oct. 27, 1936, to Frederick C. Plucker, in conjunction with a small wind turbine system.

Various systems have been proposed for improving performance of wind-driven generators by correlating the power requirements of the generators to the power output characteristics of the wind-driven rotors. Examples of these systems are disclosed by U.S. Pat. No. 4,095,120, granted June 13, 1978, to Kevin E. Moran and Eugene C. Korzeniewski; U.S. Pat. No. 4,146,264, granted Mar. 27, 1979 to Eugene C. Korzeniewski, and by the several patents described in these two patents.

U.S. Pat. No. 2,148,804, granted Feb. 28, 1939, to Edward M. Claytor, discloses a wind-generator system in which the load on the generator is varied in accordance with wind velocity. Specifically, when the wind velocity is low, the loading on the generator is low. When the wind velocity is high, the load on the generator is increased. A wind velocity control switch is provided for changing the load on the generator. A single battery or group of cells is connected to the generator when the wind velocity is low. At a predetermined higher wind velocity, the wind operated switch controls a circuit which effects the connection of the generator with a plurality of batteries in series.

U.S. Pat. No. 2,178,679, granted Nov. 7, 1939, to the same Edward M. Claytor, discloses a wind-driven generator control system which switches shunt resistors in and out of the field circuit in accordance with wind speed, in order to produce a modified generator loading curve which approximates the focus of the peaks of the propeller curves.

U.S. Pat. No. 2,339,749, granted Jan. 25, 1944, to John R. Albers discloses a system in which field current is controlled through a resistance varied by means of a governor-operated cam so that, as a rotor speed increases, resistance is gradually increased, then decreased.

U.S. Pat. No. 4,095,120, granted June 13, 1978, to Kevin E. Moran and Eugene C. Korzeniewski, discloses an electronic apparatus for matching a generator load curve to wind-driven rotor. The apparatus includes a rotor speed-responsive tachometer adapted to effect stepwise control of field current in the generator.

U.S. Pat. No. 4,146,264, granted Mar. 27, 1979, to Eugene C. Korzeniewski, also discloses a system which includes a tachometer for sensing the rotational speed of the generator and providing a control signal, but in a different manner.

Additional patents which should be considered for the purpose of putting the present invention in proper perspective relative to the prior art are:

U.S. Pat. No. 1,746,991, granted Feb. 11, 1930, to Herbert E. Bucklen; U.S. Pat. No. 2,086,279, granted July 6, 1937, to Eugene F. McDonald, Jr.; U.S. Pat. No. 2,106,557, granted Jan. 25, 1938, to Palmer C. Putnam; U.S. Pat. No. 2,178,047, granted Oct. 31, 1939, to Elmer K. Malme; U.S. Pat. No. 2,484,197, granted Oct. 11, 1949 to Albert C. Veldhuis; U.S. Pat. No. 4,039,848, granted Aug. 2, 1977 to William R. Winderl; U.S. Pat. No. 4,059,771, granted Nov. 22, 1977 to Marcellus L. Jacobs and Paul R. Jacobs and French Pat. No. 2,288,877, deposited Oct. 23, 1974 by Pierre Patin.

An important aspect of the present invention is to utilize a multiple speed pole amplitude modulated induction machine as a generator in a wind turbine system. Machines of this type are well known, but they have been used as motors rather than as generators. The pole amplitude modulation (PAM) technique is well described in the following publications:

G. H. Rawcliffe, R. G. Burbidge, W. Fong, "Induction Motor Speed Changing by Pole Amplitude Modulation", Proceedings IEE (England) 1958; G. H. Rawcliffe, W. Fong, "Speed Changing Induction Motors; Further Development in Pole-Amplitude Modulation", Ibid, 1960; G. H. Rawcliffe, W. Fong, "Speed-Changing Motors: Reduction of Pole Number by Sinusoidal Pole-Amplitude Modulation", Ibid, 1961; G. H. Rawcliffe, W. Fong, "Close-Ratio S-Speed Single-Winding Induction Motors", Ibid, 1963; W. Fong, "Wide-Ratio 2-Speed Single-Winding Induction Motors", Ibid, 1965; Two-Speed Induction Motors Using Fractional-Slot Windings", Ibid, 1965; J. M. Shulman, J. W. Colwell, E. H. Marbel, "Two-Speed Motor Starting With Inertia Loads", IEEE A 78 611-6 Power Engineering Society;

E. F. Merrill, R. L. Fuller, Jr., "Economics of Multi-Speed Motors for Power Plant Applications", *Proceedings* of the American Power Conference, Vol. 33, 1971; C. E. Pastor, R. E. G. Ratcliffe, "Applications for PAM Motors", *Power Engineering*, June, 1969.

DISCLOSURE OF THE INVENTION

One aspect of the present invention is to use a fixed pitch wind turbine rotor and a step up transmission to power a pole amplitude modulated induction machine of a type which is adapted to function as a generator at a plurality of discreet speeds of rotation. The system may include a wind speed responsive switch means for changing the speed of operation of the induction machine.

The induction machine may be operable as a motor for helping the wind energy bring the rotor up to speed.

In accordance with another aspect of the invention, a teeter connection is used to connect the wind turbine rotor to the rotor shaft for the purpose of reducing the loads on the shaft, particularly during stall of the rotor.

According to another aspect of the invention, the turbine rotor comprises a hub and a pair of fixed pitch blades extending radially outwardly from the hub and diametrically opposite directions. Each blade has a fixed pitch mid-section of airfoil cross section and a fixed pitch tip section of airfoil cross section. Preferably, each blade has plus twist inner portion adjacent the hub and changes to first a zero twist and then to a minus twist as it extends radially outwardly of the hub. Preferably, the rotor hub has a central portion with no twist, with rounded edges and a substantially constant thickness between the edges. Each blade smoothly changes into an airfoil cross section as it extends radially outwardly from the central portion of the hub.

In accordance with another aspect of the invention, the turbine rotor comprises an all-steel welded hub and each blade comprises an all-steel welded mid-section and a laminated outer end section. Preferably, the outer end section of each blade includes a fixed blade tip.

In accordance with another aspect of the invention, the outer end section of at least one blade of the turbine rotor carries a drag brake. In preferred form, the drag brake is a trailing edge portion of the blade section which is hinge-connected to the remaining portion of the blade section, for movement between a retracted position in which it forms a streamline trailing edge for the blade section and a deployed position in which it extends generally across the cord of the blade section and functions as an aerodynamic drag brake.

Other more detailed features of the invention are described in the description of the preferred embodiment and are particularly pointed out in the appended claims.

BRIEF DESCRIPTION OF THE DRAWINGS

In the drawings, which show a preferred embodiment of the invention, like element designations refer to like parts throughout the several views.

BEST MODE FOR CARRYING OUT THE INVENTION

Figure 1:
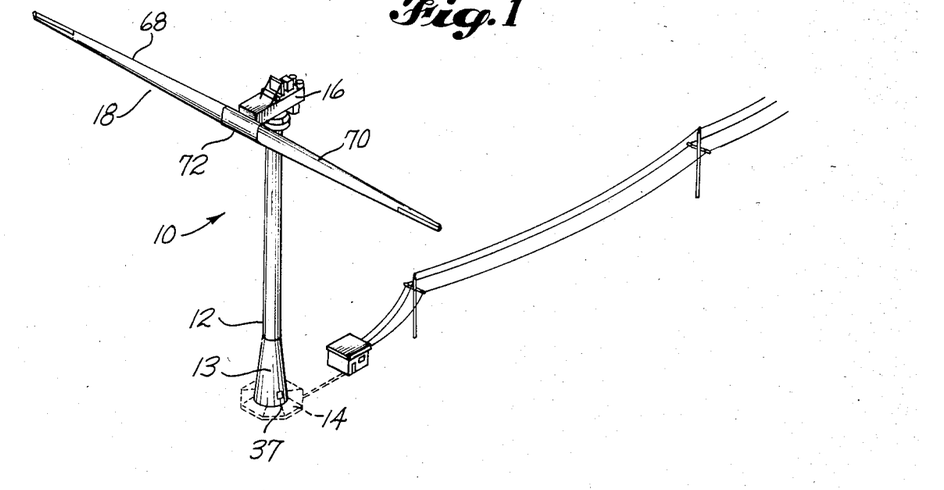
FIG. 1 is a pictorial view of a wind powdered system for generating electricity constructed in accordance with the present invention, taken from above and looking towards the front and one side of a wind turbine installation.
Figure 3:
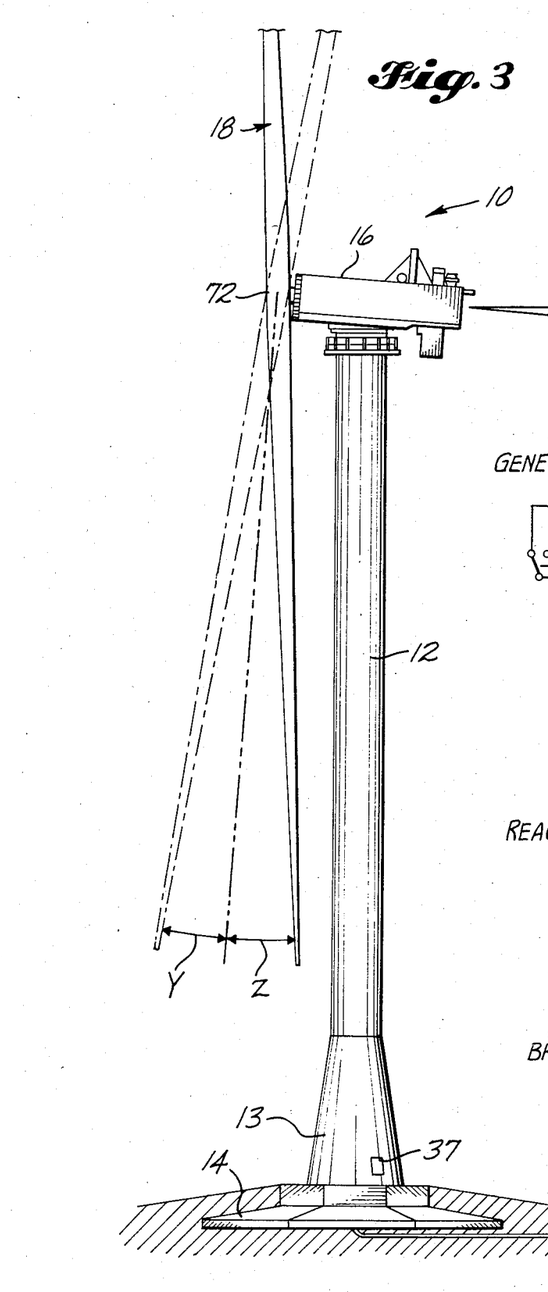
FIG. 3 is an enlarged scale side elevational view of the wind turbine with an upper portion of the wind turbine rotor omitted, such view including a solid line showing of the turbine rotor at one limit of teeter and a broken line showing of the turbine rotor at its opposite limit of teeter.

Referring to FIGS. 1 and 3, the wind turbine 10 comprises a tubular tower 12 which may be constructed from steel sections which are welded together. The base 13 of the tower may be bolted or otherwise firmly secured to a reinforced concrete foundation 14. In normal soil conditions, a buried octagonal stepped foundation configuration may be used (FIGS. 1 and 3).

In an example installation, the tower 12 is 191.5 feet tall and 11 feet in diameter, with base section 13 flaring to 21 feet in diameter at the ground.

Figure 8:
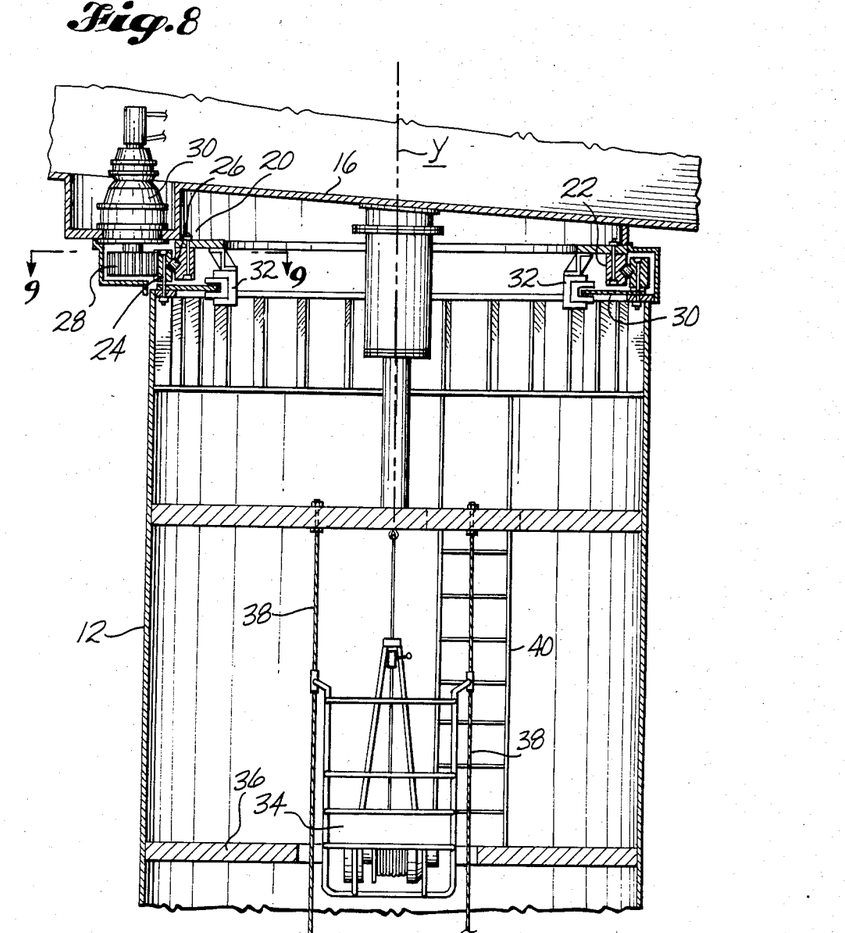
FIG. 8 is an enlarged scale vertical sectional view taken through the upper portion of a support column and a lower portion of a nacelle, in the vicinity of a main bearing supporting the nacelle for rotation on top of the support column, and a drive motor for causing rotation of the nacelle relative to the support column, with some parts being shown in side elevation.

A nacelle structure 16 is mounted on top of the tower 12 for rotation about a vertical axis y (FIG. 8). The nacelle structure 16 carries the support system for the wind turbine rotor 18 which in the example installation measures 304 feet in diameter. The vertical distance between the ground and the axis of rotation of the rotor 18 is 204.5 feet. The vertical clearance between the rotor tips and the ground is 52.5 feet.

Figure 9:
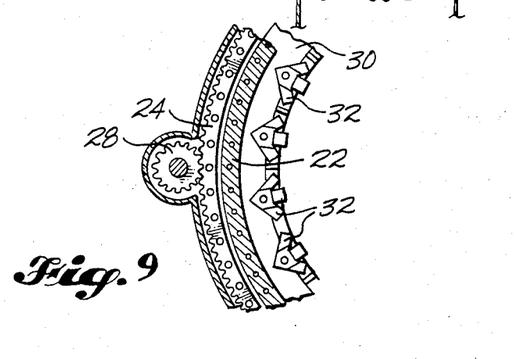
FIG. 9 is a fragmentary sectional view taken substantially along line 9—9 of FIG. 8.

A yaw control system connects the nacelle 16 to the upper end of the tower 12 and includes a yaw bearing 20. Bearing 20 is a combination bearing and comprises an inner race 22 that is bolted to the nacelle, an outer race 24 which is bolted to an upper frame portion of the tower 12, and a ring of antifriction elements 26 (e.g. rollers set at an angle to the bearing axis) between the two races 22, 24. Bearing race 24 is also a fixed ring gear having radially outwardly directed teeth (FIGS. 8 and 9). The teeth of a drive gear 28 which is connected to the output shaft of a drive motor 30 carried by nacelle 16 meshes with the teeth of yaw gear 24. Drive motor 30 may be a hydraulic motor and may include a control system which operates to power the drive motor 30 as necessary in order to rotate the nacelle for maintaining the rotor 18 facing into the wind. The yaw system preferably also includes a hydraulic brake which functions to provide damping during yaw motion. As shown by FIGS. 8 and 9, the brake may comprise an annular brake disc 30 which is fixed in position relative to the tower 12 and a plurality of brake calipers 32 which are carried by the nacelle structure 16. Additional brake calipers 32 hold the nacelle from inadvertent yawing due to wind loads during "no yaw" operation. The brake calipers 32 are spring actuated and hydraulically released. This is a fail-safe feature assuring that the brakes are applied if there is a hydraulic failure.

In the example embodiment, the raceway diameter of bearing 20 is approximately 134 inches in order to handle the large overturning moments and to react the rotor torque.

The tower includes an internal lift 34 which may be a suspended staging. By way of example, lift 34 may be of the type disclosed by U.S. Pat. No. 2,998,094, granted Aug. 29, 1961 to Sidney L. Fisher. The lift 34 ascends and decends between ground level and an elevated platform 36 which is located near the top of the tower 12. Entry into tower 12 at ground level is via a door 37. Guide cables 38 may be provided for guiding and stabilizing the lift 34. A ladder 40 extends upwardly from platform 36 to an access opening in the bottom of the nacelle housing 16.

Figure 2:
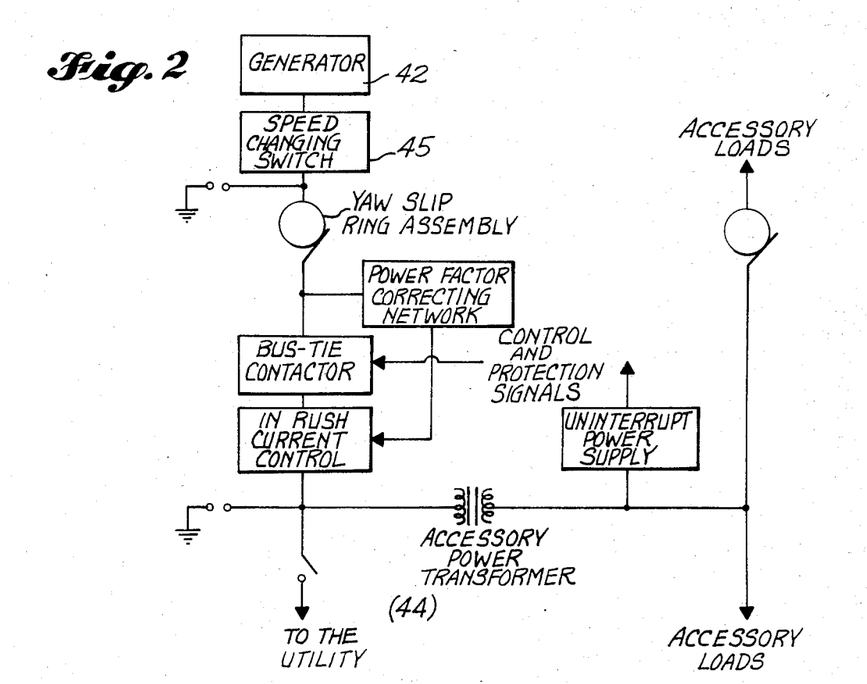
FIG. 2 is a simplified diagram of an electrical power system.

Referring to FIG. 2, the electrical power system consists of the electrical equipment required for the generation, conditioning, and distribution of electrical power within the wind turbine 10. FIG. 2 shows a one-line diagram of the electrical power system. Such system includes an electrical generator 42 which is powered by the wind turbine rotor 18. Electrical power and appropriate voltage is delivered to a utility interface point which is the output side of a fused manual disconnect switch 44 located at the foot of the tower 12. Once the wind turbine system and the utility are electrically connected, the existence of the tie will automatically result in generator voltage and frequency control, and thus maintain specified generator and rotor r.p.m.

The illustrated system includes a four pole dual speed induction machine designed to operate at two different r.p.m.'s. In the illustrated example, the machine 42 is designed to operate at 1200 or 1800 r.p.m.

By way of typical and therefore non-limitative example, the generator 42 may be a Pole Amplitude Modulated (PAM) machine of the type manufactured by the Westinghouse Electric Corporation and marketed as an electric motor.

An oil filled, five pole, motor operated speed changing switch 46 (FIG. 4) is used to control the generator speed.

Figures 5, 25:
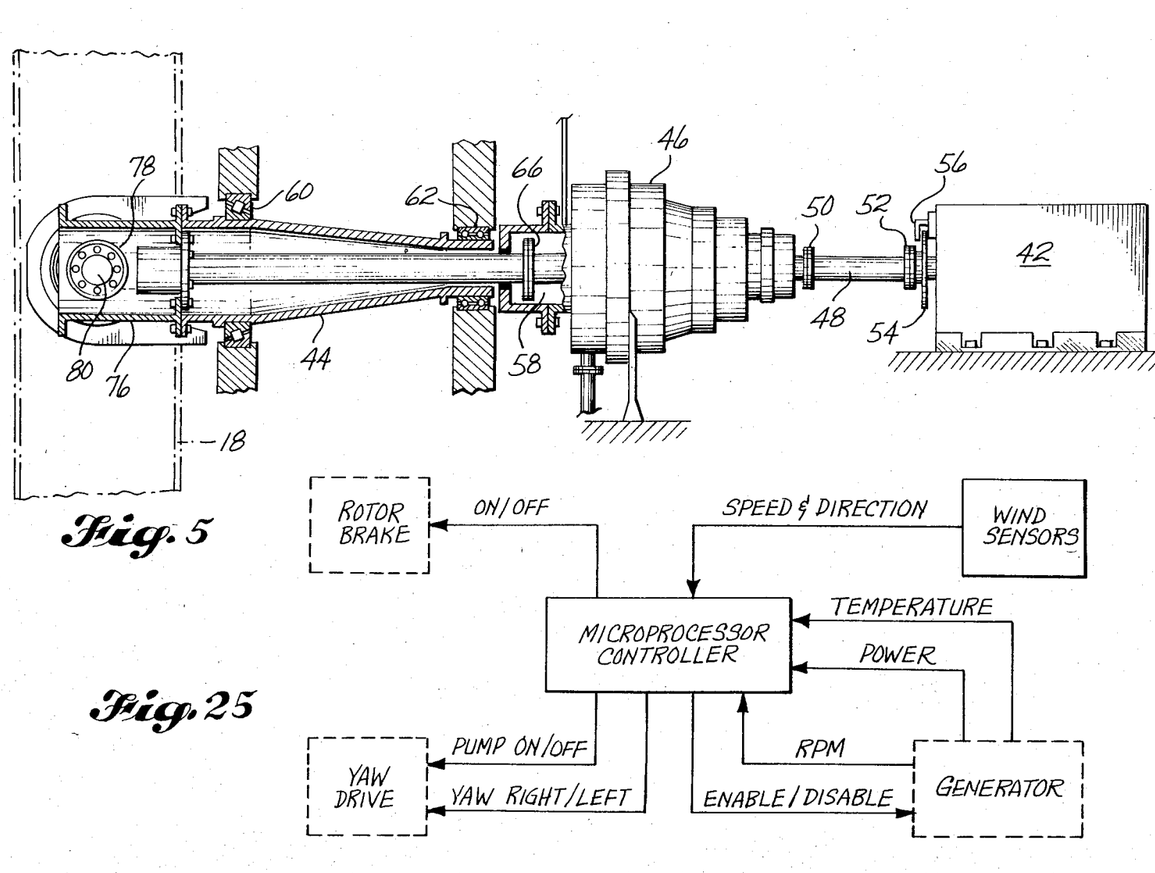
FIG. 5 is a side elevational view of a generator drive assembly, with some parts being omitted, some being shown schematically, and others being shown by broken lines.
FIG. 25 is a block diagram illustrating the interfaces and flow of information between the control system elements and the other subsystems.

Referring to FIG. 5, the system includes a drive train assembly consisting of a low speed shaft 44, a gear box 46, a high speed shaft 48, couplings 50, 52, and a rotor brake 54. In FIG. 5 the rotor brake is shown in the form of a disc 54 carried by the rotating shaft of machine 42 and a brake caliper 56 which is fixed in position, such as being mounted on the generator housing.

The low speed shaft 44 connects the rotor 18 to the gear box input 58. Shaft 44 is supported from the nacelle structure by two self-aligning bearings 60, 62. Low speed shaft 44 may include an internal quill shaft 64 which is connected to the input shaft 58 of the transmission 46 by means of a flexible coupling 66. The use of a flexible coupling 66 compensates for misalignment between the quill shaft 64 and the gear box input shaft 58.

The gear box 46 is a three-stage planetary gear box. In the illustrated example, the step up ratio of gear box 46 is 95:1. The output shaft of the gear box 46 is attached to the input shaft of machine 42 by means of a high speed steel shaft 48 and two couplings 50, 52. The brake caliper 56 is disengaged by the application of hydraulic pressure. The brake is engaged by spring force when the hydraulic pressure is relieved.

Figure 10:
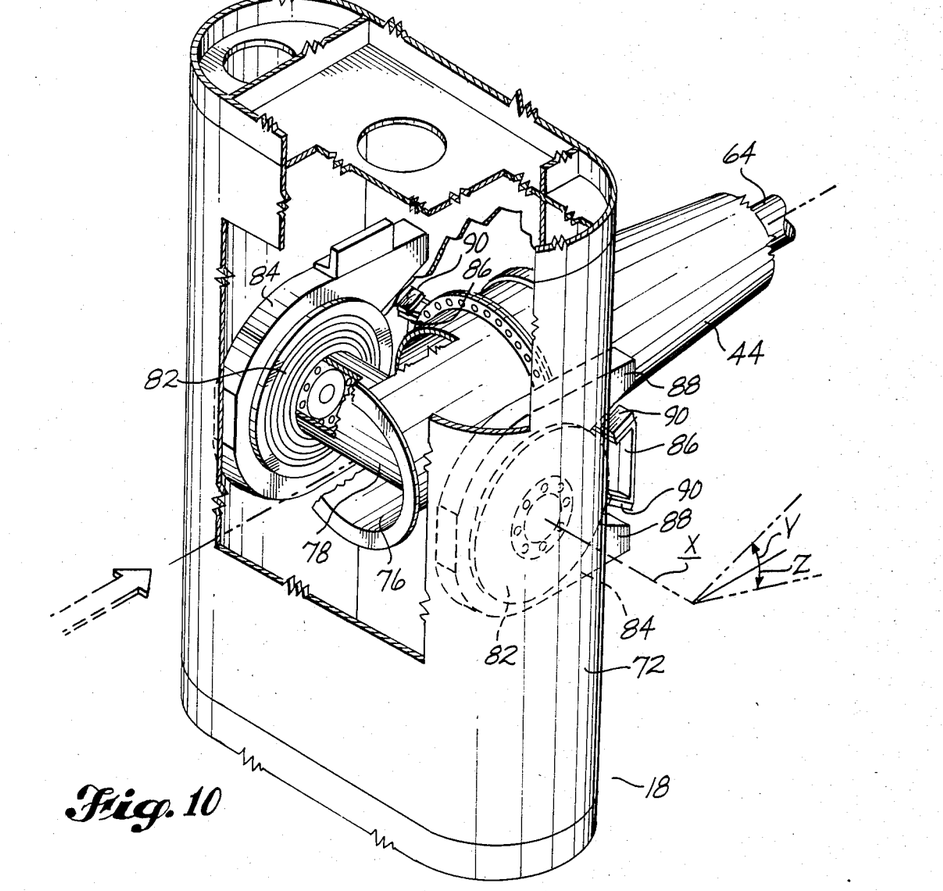
FIG. 10 is a pictorial view of a teeter connection between the hub of the turbine rotor and the outboard end of the generator drive shaft, with foreground portions of the rotor hub and the teeter mechanism being cut away, and with opposite limits of teeter movement being indicated.
Figures 19, 20, 21, 22, 23, 24:
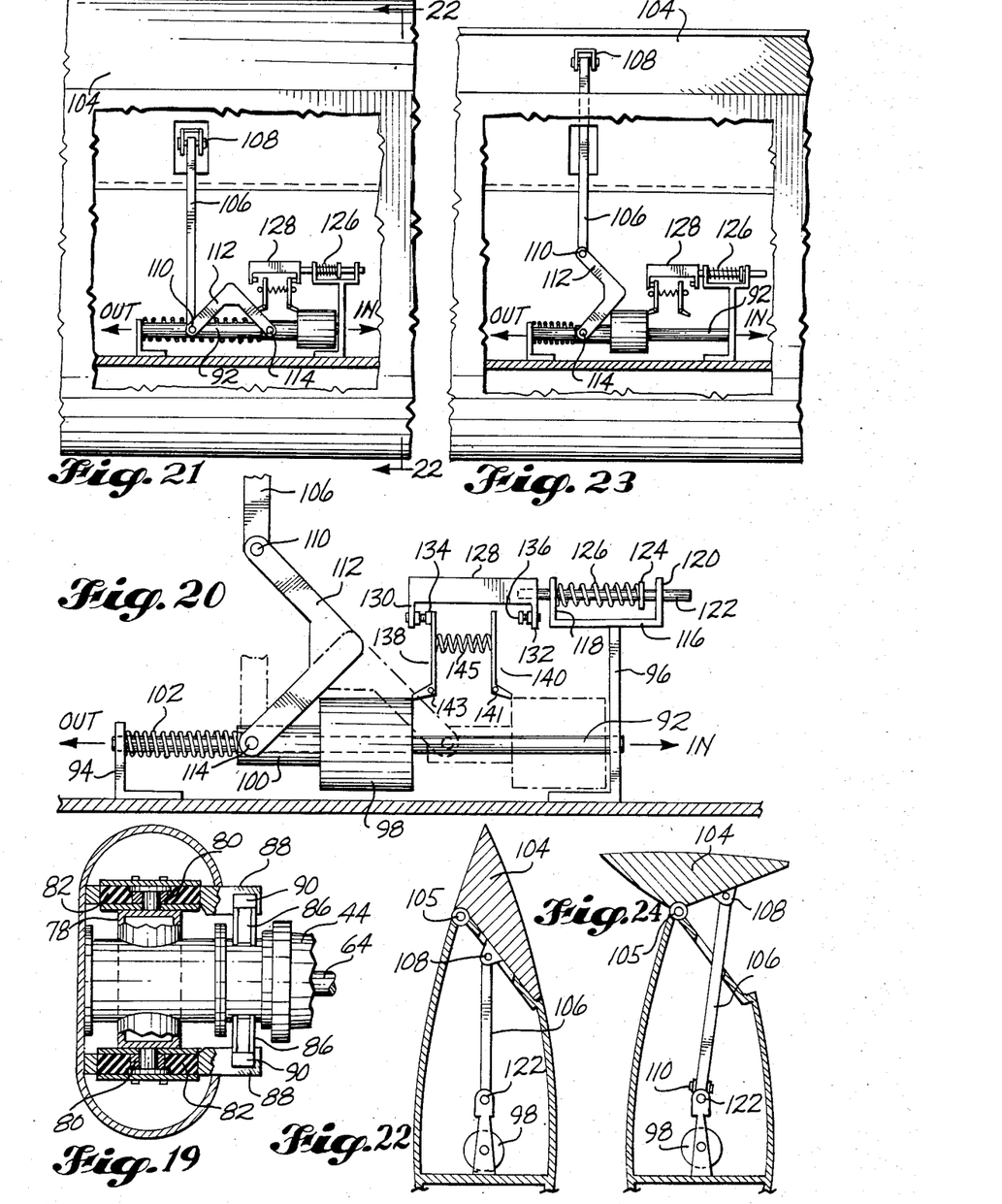
FIG. 19 is a sectional view taken substantially along line 19—19 of FIG. 11, showing some additional detail of the teeter connection between the turbine rotor and the outboard end of the generator drive shaft.
FIG. 20 is a side elevational view of the centrifugal force controlled and operated mchanism for positioning the drag brake, including a solid line showing of the mechanism in a deployed position and a broken line showing of the mechanism in a retracted position.
FIG. 21 is a fragmentary view of the turbine rotor in the vicinity of the drag brake operating mechanism, with the foreground portion of the rotor cut away to disclose the mechanism, said mechanism being shown in its retracted position.
FIG. 22 is a sectional view taken substantially along line 22—22 of FIG. 21.
FIG. 23 is a view like FIG. 21, but showing the operating mechanism and the drag brake in their deployed position.
FIG. 24 is a view like FIG. 22, but showing the drag brake and its operating mechanism in their deployed position.
Figure 26:
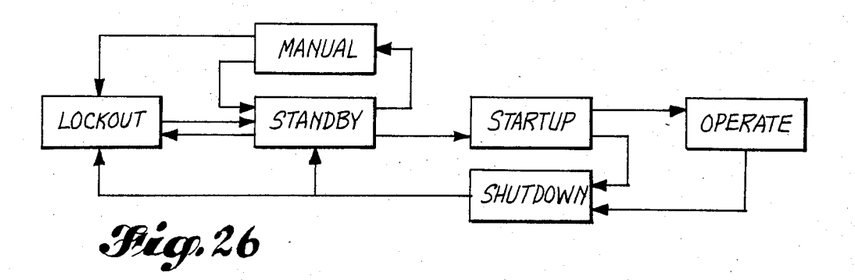
FIG. 26 is a block diagram of the operating modes of the wind turbine system.

The turbine rotor 18 comprises two fixed pitch blades 68, 70 and an interconnecting hub 72. Each blade 68, 70 extends radially outwardly from the hub 72 in a direction diametrically opposite from the other blade. Each blade 68, 70 includes a fixed pitch mid-section of airfoil cross section and a fixed pitch tip or outer section, of airfoil cross section. Preferably, each blade has a plus twist inner portion adjacent the hub and changes to first a zero twist and then a minus twist as it extends radially outwardly from the hub 72. As best shown by FIGS. 10 and 19, the central portion of the hub 72 has no twist. It has a uniform thickness and is defined by parallel sidewalls interconnected by rounded edges. Each blade 68, 70 smoothly changes into an airfoil cross section as it extends radially outwardly from the central portion of the hub 72.

In preferred form, the airfoil profile of each blade changes as the blade extends radially outwardly from a NACA 230XX airfoil in the inboard region to a NACA 430XX airfoil in the outboard region. In the example, each blade changes from a substantially NACA 23028 airfoil profile at plus twist, to a substantially NACA 23023 airfoil profile at zero twist, to a substantially NACA 43018 airfoil profile at zero twist, to a substantially NACA 43012 airfoil profile at minus twist.

Figure 11:
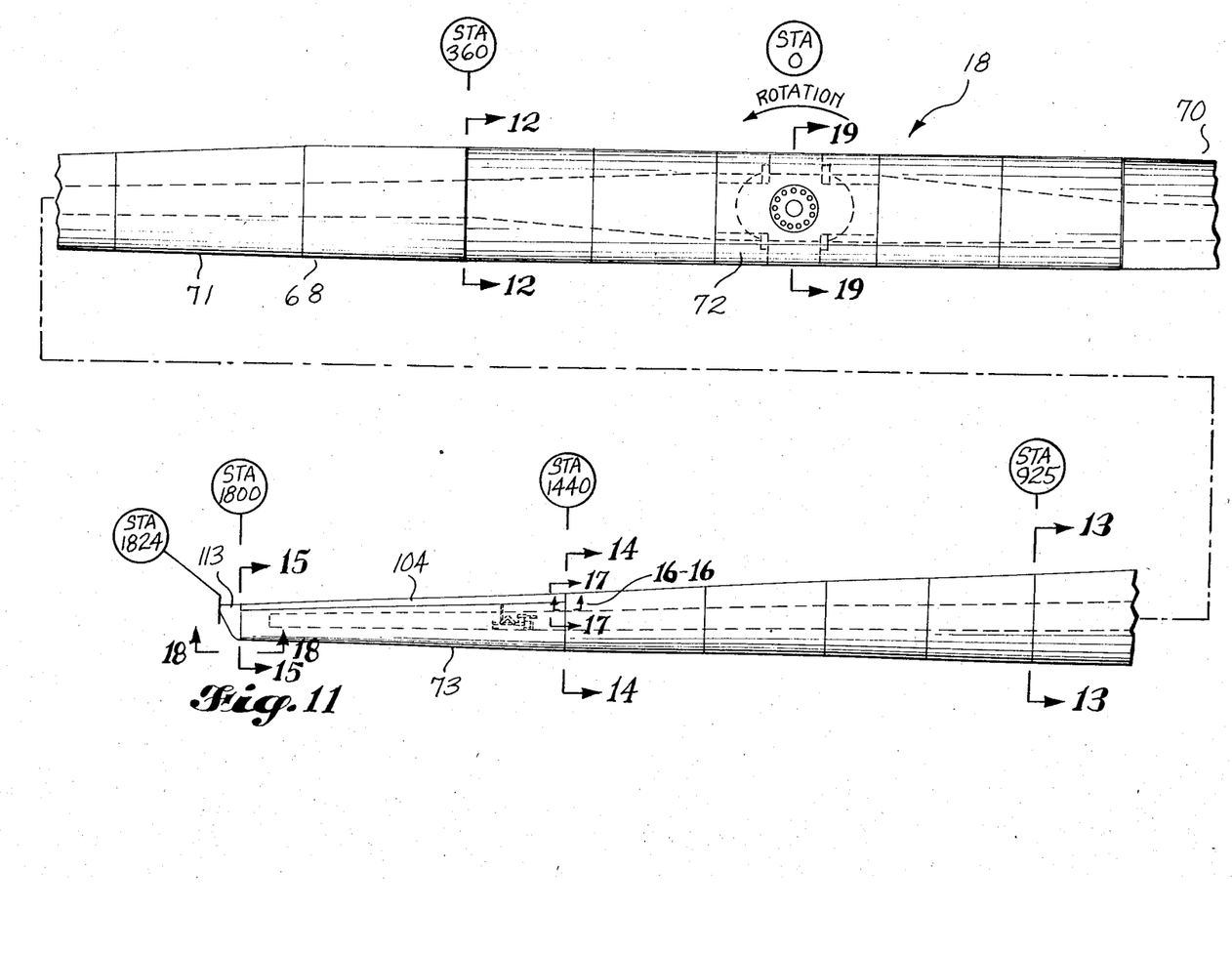
FIG. 11 is a front elevational view of one blade of the turbine rotor, the hub and a portion of the second blade, shown in two parts.
Figure 12:
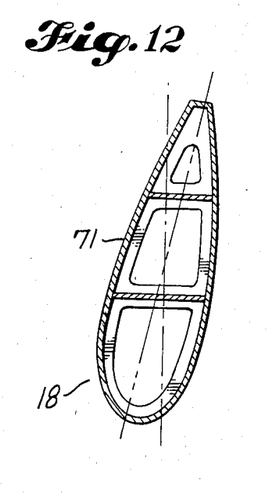
FIG. 12 is a cross-sectional view taken substantially along line 12—12 of FIG. 11.
Figure 13:
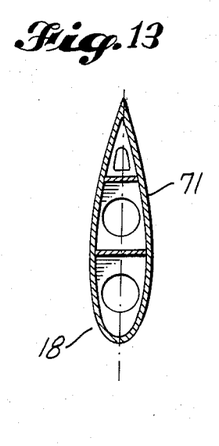
FIG. 13 is a cross-sectional view taken substantially along line 13—13 of FIG. 11.

The following table shows the blade profile changes at the radial stations which are identified in FIG. 11:

| BLADE DESIGN PARAMETERS | | | | |
|---|---|---|---|---|
| Radial Station | Twist (Degrees) | Thickness (Inches) | Chord (Inches) | Airfoil Profile |
| 360 | +12.0 | 38.45 | 126.0 | NACA 23028* |
| 925 | 0.0 | 22.84 | 99.29 | NACA 23023 |
| 1440 | — | 11.63 | 14.63 | NACA 43018 |
| 1800 | −4.0 | 4.85 | 40.39 | NACA 43012 |
| 1824 | 0.0 | 0.0 | 0.0 | —** |

*Trailing edge is truncated at this radial station.
**Tip station. Twist is a constant −4.0 from station 1824 to tip.

The distributions are linear between the tabulated values.

Preferably, each blade is manufactured in two major sections; a mid-section 71 and a tip section 73. In the example, the mid-section 71 is 90 feet long and is an all-steel welded structure. The tip section 73 is approximately 32 feet long and is constructed from laminated wood or another structural material of similar strength and weight.

The two blade sections 71, 73 are bolted together using steel studs 75 which are embedded in the wood tip section. The blade mid-section 71 is attached to the hub 72 by a field welded splice. The rotor hub 72 in the example is 60 feet long and is an all-steel welded structure.

Hub 72 is attached to the outer end of the low speed shaft 44 by means of a teeter hinge 74. Referring to FIGS. 5, 10, and 19, the outer end portion 76 of shaft 44 carries a cross tube 78 which carries a trunnion 80 at each of its ends. The trunnions 80 are received within elastomeric radial bearings 82 which are carried by the hub 72. The trunnions 80 are fixed relative to tube 78 which is a fixed portion of tube 76 and the shaft 44 of which it is a part.

The rotor 18 is free to teeter within the limits provided by stop mechanisms which consist of yolks 84 carried by the hub section and abutments 86 which are carried by the shaft 44. The yolks 84 open inwardly and each comprises a pair of spaced apart arms 88. The abutments 86 are positioned within the spaces between the arms 88. The distance between arms 88 is larger than the dimension of the abutment 86 in the same direction. As a result, the rotor 18 can teeter about the trunnion axis x until one or the other of arms 88 make contact with an associated stop pad 90 carried by the abutments 86. In the example, the rotor 18 is able to teeter about seven degrees away from a perpendicular position relative to the shaft axis, in either direction.

As shown by FIGS. 11, 17 and 20–24, the triangular trailing edge of each outer or tip section of rotor 18 is hinge connected to the rest of the section and is deployable as an aerodynamic drag brake for fail-safe overspeed control. The trailing edge or brake section is pivotally connected at a central side location, so that when it is pivoted about 90 degrees from its normal position it will present a substantial surface which extends generally perpendicular to the general plane of the airfoil section.

The drag brakes are automatically actuated by spring loaded mechanical trigger systems when the speed of rotation of the rotor 18 exceeds a predetermined value. The brake sections return to their normal positions whenever the rotor speed drops below such predetermined value. The trigger system will now be described in some detail.

Referring first to FIG. 20, the mechanism comprises a guide shaft 92 which extends in the longitudinal direction of the rotor blade and is supported at its two ends by brackets 94, 96. A weight 98 is slidably mounted on rod 92. Weight 98 may include a support extension 100 at its outer end. A compression spring 102 is interposed between the outer end of extension 100 and a wall of bracket 94. Spring 102 normally biases the weight 98 radially inwardly into the position shown in FIG. 21, and the phantom lines of FIG. 20. As shown by FIGS. 22 and 24, the brake section 104 has a generally triangular cross section. It is connected at its apex to a side location of the blade section, for pivotal movement about an axis which extends in the longitudinal direction of the rotor blade. A perpendicular control arm 106 is pivotally attached at its outer end to a location 108 on the brake section 104 that is offset from the pivot connection 106. At its inner end arm 106 is pivotally attached at 110 to a right angle link 112. Link 112 is pivotally attached at its opposite end 114 to the support extension 100. When the control weight 98 is in its inner position, the connection 110 is located adjacent to guide shaft 92 and the brake section 104 is in its retracted position. Movement of weight 98 radially outwardly causes a rotation of the link 112 and an outward movement of rod 106. As rod 106 moves outwardly it swings the brake section 104 from its retracted position out into a deployed position (FIG. 24).

A first lock means is provided for locking control weight 98 into its inner position. A second lock means is provided for locking weight 98 into its outer position. These lock means are triggered by centrifugal force.

Referring again to FIG. 20, bracket 96 includes a yolk like support 116 at its outer or free end. Support 116 includes a pair of spaced apart, parallel support arms 118, 120. An alignment shaft 122 extends through aligned openings in the arms 118, 120. Shaft 122 carries a fixed stop member 124. A compression spring 126 is located between the stop member 124 and arm 118. A trigger weight 128 is secured to the outer end of shaft 122. Spring 126, acting on stop 124, normally biases shaft 122 and weight 128 radially inwardly.

Trigger weight 128 includes a pair of laterally extending support lugs 130, 132. Each support lug carries a trip member 134, 136. Members 134, 136 may be in the form of bolts having head portions and threaded shank portions. This enables them to be threaded into openings carried by the lugs 130, 132. The threaded connection provides a way of fine adjusting the position of the heads by a simple rotation of members 134, 136.

The headed portions of members 134, 136 are directed towards each other. First end portions of a pair of lock levers 138, 140 are positioned in the space between the heads of members 134, 136. Levers 138, 140 include opposite or second end portions which are positioned to extend into the path of weight 98. Levers 138, 140 are pivotally mounted between their ends to a support member (not shown) which is attached to a frame portion of the rotor.

The lock weight 128 and the brake weight 98 are each subjected to centrifugal forces as a result of rotation of the rotor about the drive shaft axis. As rotational speed is increased beyond normal speed, the lock weight 128 moves outboard against the compression of the spring 126. The contact head 136 moves against the upper end of the lever 140, and pivots the lever 140 about pivot axis 141, until the brake weight 98 is free to move outboard against its compression spring 102, in the meantime moving pivot point 114 outboard so that pivot point 110 is moved aft to actuate the brake arm 106. In this process, the weight 98 has moved outboard of the lever 138 (FIG. 20). Lever 138 prevents the inboard movement of weight 98 until the lock weight 128 moves inboard and trips the lever 138. The spring 145 prevents the inactive linkage from flopping around, which could prevent the opposite from being in proper position to act as a lock.

Figure 17:
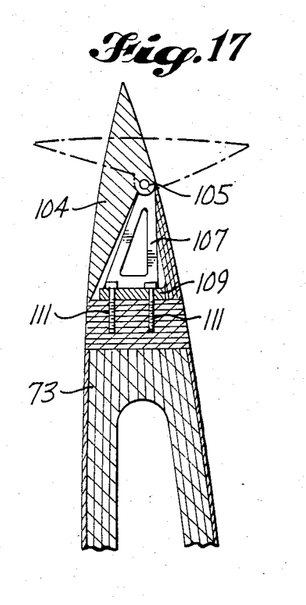
FIG. 17 is a longitudinal sectional view taken in the region of the drag brake, including a solid line showing of the drag brake in its retracted position and a broken showing of the drag brake in its deployed position.

Brake section 104 may be mounted for pivotal movement about an axis 105, in a manner best shown by FIG. 17. That is, a mounting bracket 107 having a base 109 may be connected to the blade body by mounting bolts 111 which extend through openings in the base 109. A pivot pin connection is provided at the apex end of each bracket 107, connecting such apex end to its end of the brake section 104, for pivotal movement about the pivot axis 105.

Figures 14, 15:
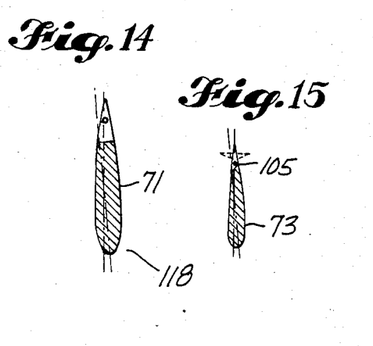
FIG. 14 is a cross-sectional taken substantially along line 14—14 of FIG. 11, such view including a solid line showing of the drag brake in its retracted position and a broken line showing of the drage brake in its deployed position.
FIG. 15 is a cross-sectional view taken substantially along line 15—15 of FIG. 11, such view also including a solid line showing of the drag brake in its retracted position and a broken line showing of the drag brake in its deployed position.
Figure 16:
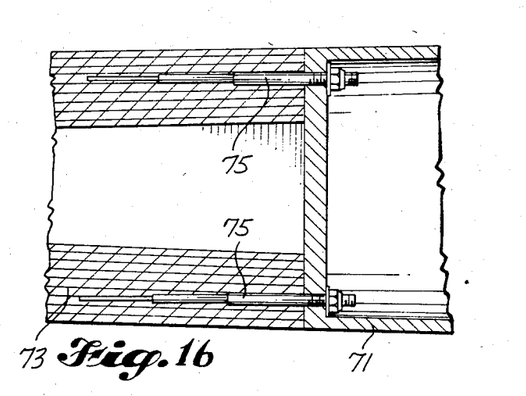
FIG. 16 is a fragmentary longitudinal sectional view in the vicinity of where the wooden outer end section of the rotor is attached to the outer end of the intermediate section of the rotor.
Figure 18:
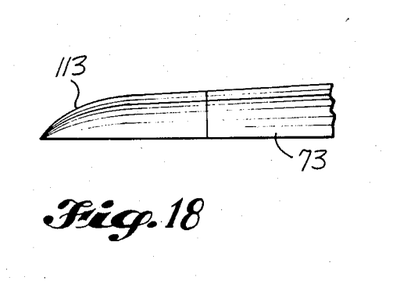
FIG. 18 is a pictorial view of a fixed, sculptured tip section of the rotor.

FIG. 11 shows that in plan form the tip section 113 has a leading edge which angles rearwardly. FIG. 18 shows that the tip section 113 decreases in thickness as it extends outwardly. Thus, in cross section, the tip section maintains an aerodynamic shape, similar in configuration to the shape shown by FIG. 15, but progressively decreasing in size. The leading edge progressively sweeps rearwardly and the rotor tip 113 progressively decreases in thickness from station 1800 outwardly to station 1824. A relatively flat lower surface is maintained, so the decrease in thickness curves by a reshaping of the upper surface of the tip section 113. The upper surface slopes downwardly as it extends outwardly, to provide the tip section taper.

Figure 6:
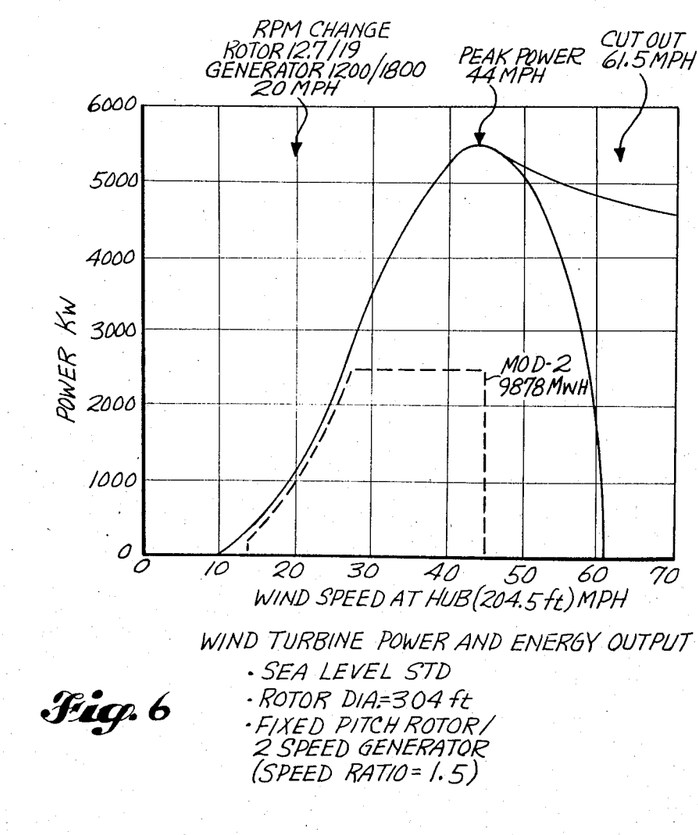
FIG. 6 is a graph of wind turbine power and energy output, comparing the fixed pitch rotor system of the present invention with an existing variable pitch rotor system.

The power output of the example wind turbine system is shown in FIG. 6. As indicated, the system can start to function when the wind speed exceeds 10 miles per hour. During the startup process, the generator 42 is used as a motor to accelerate the rotor to approximately 6 r.p.m. The remainder of the rotor acceleration is accomplished aerodynamically. For wind speeds below 20 m.p.h., the system will generate power at a rotor speed of 12.67 r.p.m. For higher wind speeds, the rotor will be operated at 19.0 r.p.m.

The r.p.m. change is accomplished with the aid of the generator 42. To change from 12.67 r.p.m. to 19.0 r.p.m., the generator 42 is taken offline and the motor operated switch 45 is operated to change the generator pole configuration from six poles to four poles. The generator 42 is then reconnected to the utility grid and pulls the rotor up to 19.0 r.p.m. Less than two seconds are required to change the pole configuration. To go from the high r.p.m. to the low r.p.m., a similar procedure is used. The generator is taken off the line. The pole configuration is switched from four to six. The generator is reconnected to the utility grid and pulls the rotor down to 12.67 r.p.m.

Figure 7:
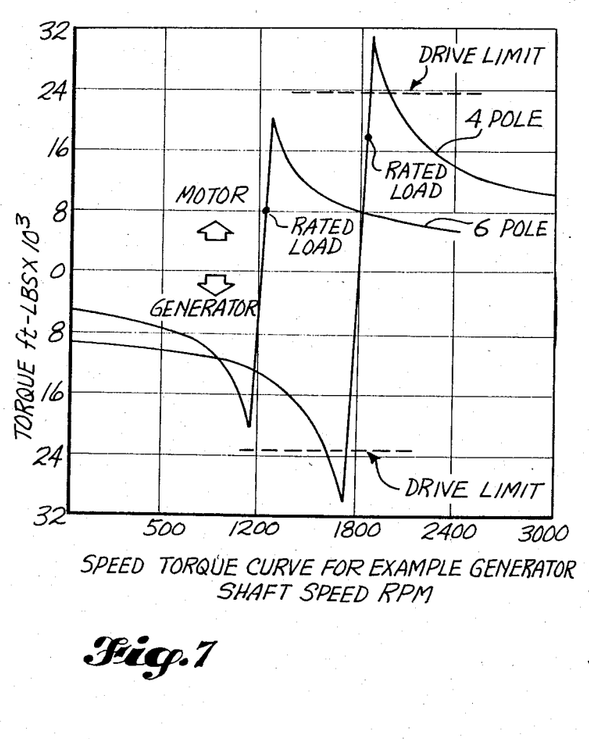
FIG. 7 is a shaft speed verses torque curve for an example two speed induction machine.

The generator 42 is a four pole, dual speed induction machine designed to operate at 1200 or 1800 r.p.m. It is very much like the well known Westinghouse Pole Amplitude Modulated (PAM) motor. An oil filled, five pole, motor operated speed changing switch 45 is used to control the generator speed. The example generator produces a three-phase, sixty Hertz current at 4160 volts and is rated at 1300 kW and 4400 kW for its respective operating speeds for elevations up through 3300 feet. The generator 42 is connected to a capacitor network for power factor correction and to a line reactor to limit phase transition in rush currents (FIG. 2). FIG. 7 shows the six and four pole speed-torque characteristics of the example generator at full rated voltage. This curve shows that the drive system capability can be exceeded in the four pole configuration by 30% unless a line reactor is used that will reduce the peak torque at that amount. The capacity of the generator to act as a motor to start the wind turbine with this reduced torque capability is very satisfactory. Startup time to 6 r.p.m. is approximately three minutes.

Of course, the system will be provided with protective relays to guard against potential electrical faults, out-of-tolerance performance, or equipment failures. These relays will detect over-voltage, over-current, reverse phase sequence, reverse power and differential current, and will protect the system by directing the control system to shut down, or if required, tripping the bus tie contactor. Accessory power for operation, control and maintenance is obtained from the utility or generator output depending on the operating mode, and is internally conditioned to appropriate voltage levels. A battery, floating across a charger, provides an uninterruptable power supply for operation of protection devices and critical loads.

In preferred form, the system will include two wind sensors (not shown) which are mounted above and to either side of the nacelle. Dual sensors are required to preclude blockage of one sensor by the rotor in the non-rotating condition. The wind sensors may be conventional propeller and vane sensors that produce analog voltage signals proportional to wind speed and yaw angle relative to the nacelle. During operation, the data aquisition module in the microprocessor will use the highest rating from either sensor to form the averages used in the other modules (FIG. 25).

As mentioned above, the example generator 42 is a dual speed induction generator similar in design to the Westington Pole Amplitude Modulated (PAM) motor.

Figure 4:
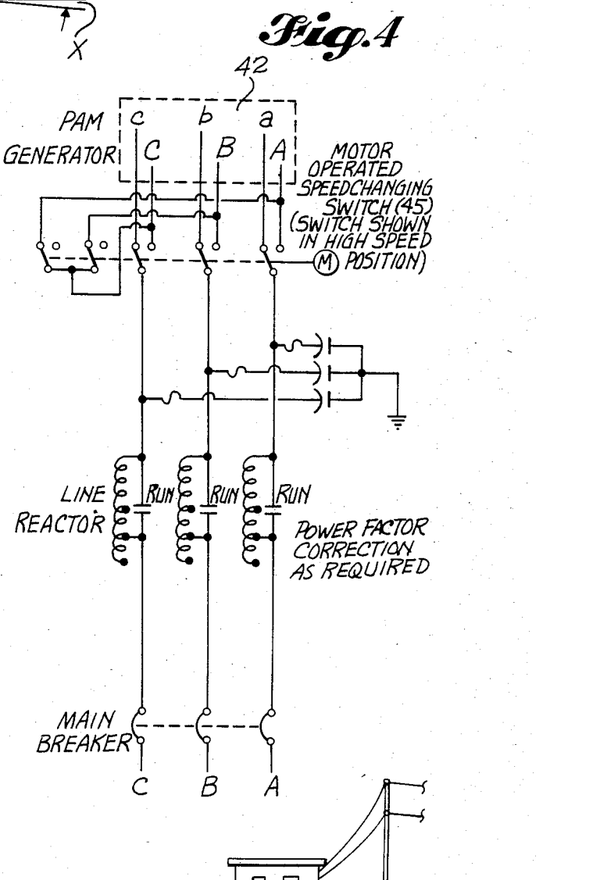
FIG. 4 is a schematic diagram of a speed control system for a pole amplitude modulated generator.

A PAM generator providing two-speed operation is available in a variety of speed ratios. The PAM generator utilizes a single winding. It differs from conventional single-speed ac induction generators only in winding design since construction details are identical. The two operating speeds are achieved by changing the connections to the six main leads of the stator. The internal motor coil connections are not changed, but one-half of the coils are reversed in polarity (modulated) as the reconnection of the main leads and a number of parallels in the motor winding is also changed. In a PAM generator the winding will be separated into two sections which are connected in parallel for one speed and in series with the polarity of all the coils in one direction reversed, for the other speed. Speed is selected by the position of the switch 45 that makes the stator connections (FIG. 4).

PAM generators can be designed according to three different relationships between low and high speed power ratings: constant power, constant torque, and variable torque. Constant power (low speed rating-=high speed rating) designs are governed by the low speed requirements, are most constantly, and are not useful for wind turbines. Constant torque (rated power proportional to synchronous speed) design costs roughly 105% more than equivalent single-speed machines and could be applied to wind turbines. Variable torque (rated power proportional to synchronous speed) designs have a 60% cost increment and generally match the power small $AV^3$ relationship of industrial fans and wind turbines. The low speed power rating is determined by the selected speed change control points.

In addition to two-speed versions, PAM generators are also available in three-speed versions, such as four-pole, six-pole, eight-pole or six-pole, eight-pole, ten-pole which are feasible and can be achieved in a single winding with twelve terminals.

With reference to FIG. 25, some of the system dynamics and control will be described.

The control system will consist of the hardware and software required to provide the various automatic, manual, and remote operation modes for the wind turbine. The block diagram (FIG. 25) illustrates the interfaces and flow information between the control system elements and the other wind turbine subsystems.

In the event of a sensed out-of-tolerance temperature, hydraulic pressure, hydraulic fluid level, or vibration amplitude, a condition will exist that requires some form of checkout or maintenance. Any of these criteria will automatically institute the lockout mode.

Maintenance trouble shooting may require the exercising or monitoring of switches, pumps, sensors or other devices while the wind turbine is either connected to or disconnected from the utility. Selection of the manual mold will allow maintenance technicians to perform limited checkout. For example, limited exercise of the yaw mechanism can be performed with the rotor turning.

When the drag brake is applied during normal shutdown, the control system will automatically switch into the standby mode to await the proper wind conditions to restart the wind turbine. When the startup criteria have been satisfied, the control system will automatically switch to the startup mode.

When the wind speed criteria for startup have been satisfied during the standby mode, the control system will switch to the startup mode and initiate the startup procedure. Yaw errors are first reduced to less than 5 degrees, the generator is switched to the six pole configuration, the low voltage starter circuit is selected, the rotor brake is released, and the bus-tie contactor is closed. The generator/motor will then initiate rotation and help to accelerate the rotor up to 6 r.p.m. The bus-tie contactor is then opened and the rotor is accelerated aerodynamically. If the average wind speed is below 20 m.p.h., the generator pole configuration will remain unchanged, and the bus-tie contactor will be closed when the generator speed is within 5% of 1200 r.p.m. If the average wind speed is greater than 20 m.p.h., the generator will then be switched to the four pole configuration and, when the generator speed is within 5% of 1800 r.p.m., the bus-tie contactors will be closed. For either pole configuration, the bus-tie contactor will be closed. For either pole configuration, the bus-tie contactor closure will institute a switch to the operate mode.

If the wind speed changes during the startup mode so that its average value is less than 10 m.p.h., the shutdown mode will automatically be selected. Also, if the average shaft rate does not continue to increase throughout the monitoring phase, a shutdown will be initiated. This condition could be caused by inadvertent drag brake extension or by excessive friction within the drive train. Should a similar condition occur on the second start of attempt, the rotor will be stopped and the lockout mode selected.

During normal operation, the control system will keep the rotor aligned into the wind. Continuous averages of wind direction will provide yaw slew commands to keep the yaw errors minimized. If a long period average of wind direction exceeds plus or minus 5 degrees or a short period average exceeds plus or minus 20%, a yaw slew command will be automatically issued to reduce the angle. If yaw angles exceed plus or minus 20° for an extended period, a shutdown will be commanded.

The control system will also monitor wind speed to determine wind changes in rotational speed should occur. When the generator is operating at 1200 r.p.m. and the average wind speed exceeds 21 m.p.h. in increasing winds, the bus-tie contactor is opened and the generator is switched from the six pole to the four pole configuration. The pole switch over takes less than two seconds during which the unloaded rotor will accelerate the generator to approximately 1350 r.p.m. The additional rotor acceleration is accomplished electrically and aerodynamically following the reconnection of the generator to the line. The complete r.p.m. change cycle will be accomplished in approximately ten seconds.

When the generator is operating 1800 r.p.m. and the average wind speed falls below 19 m.p.h., the bus-tie contactor is opened and the generator is switched from the four-pole to the six-pole configuration. During the two second pole transition period, the rotor will accelerate the generator to about 2000 r.p.m. Following closure of the bus-tie contactor, power production will continue as the generator accelerates to the low r.p.m. The r.p.m. change will be accomplished in about twenty seconds. Loss of power production will be limited to the two second pole transition period.

The control system will also determine when the operational wind speed range has been exceeded. For wind speeds below 10 m.p.h., power must also be supplied from the bus to maintain operational speed. In this situation, the consumed kWh will be monitored, and shutdown will be initiated when a predetermined level of consumption is reached. For high wind speed of approximately 60 m.p.h., the wind speed signal will be monitored. Shut down will be initiated when the wind speed exceeds 60 m.p.h. by removing the generator from the grid. The rotor will overspeed and deploy the drag brake to stop rotation.

During the operating mode, the control system also surveys protective instrumentation installed in other subsystems and components. Any out-of-tolerance indication will result in shutdown of the wind turbine.

The shutdown mode can be entered from either the startup mode or the operate mode under the direction of commands from the control system or the CRT terminals.

During the shutdown mode, the control system will only open the bus-tie contactor and apply the rotor shaft brake. In winds greater than 15 m.p.h., the bus-tie contactor is opened first. The rotor is allowed to accelerate and deploy the rotor blade drag brakes. When the rotor speed has dropped to 5 r.p.m., the shaft brake is applied. In winds below 15 m.p.h., the shaft brake is applied first and then the bus-tie contactor is opened.

We claim:

1. A wind turbine system for generating electricity, comprising:
 a wind turbine rotor;
 a rotor shaft connected to said hub for rotation with said wind turbine rotor;
 a step-up transmission having a low speed input connected to said rotor shaft and a high speed output;
 a rotary pole amplitude modulated induction machine having a rotor that is connected to the output of said transmission, said machine being operable as a generator at a plurality of discreet speeds of rotation;
 wind speed responsive switch means for changing speed of operation of said induction machine; and
 wherein said wind turbine rotor comprises an elongated central hub with no twist having rounded edges and a substantially constant thickness between the edges;
 a pair of fixed pitch essentially straight blades, each blade extending radially outwardly from said hub in a direction diametrically opposite from the other blade;
 each said blade having a mid-section of airfoil cross section positioned radially outwardly of said central hub portion, and a tip section of airfoil cross section positioned radially outwardly of the mid-section;
 each said blade smoothly changing from the substantially constant thickness and rounded edge shape of the central hub portion into an airfoil cross section as it extends radially outwardly from the central hub portion;
 each blade first changing to first a plus twist and then a zero twist and then a minus twist as it extends radially outwardly;
 each said blade tapering in thickness and chord as it extends radially outwardly from a location in its mid-section through its tip section; and
 wherein the tip section of each said blade includes a sculptured tip end portion which decreases in thickness as it extends radially outwardly, said tip portion having an aerodynamic cross-sectional shape which progressively decreases in size, and having a leading edge which progressively sweeps rearwardly.

2. A wind turbine system according to claim 1, wherein the airfoil profile of each blade changes as the blade extends radially outwardly from a substantially NACA 23028 airfoil profile at plus twist, to a substantially NACA 23023 airfoil profile at zero twist, to a substantially NACA 43018 airfoil profile at zero twist, to a substantially NACA 43012 airfoil profile at minus twist.

3. A wind turbine system according to claim 1, wherein said rotor has a welded steel hub, and wherein each blade comprises a welded steel mid-section and a laminated wood outer end section.

4. A wind powered system according to claim 1, comprising teeter means housed within each hub, said teeter means connecting the hub of the wind turbine rotor to said rotor shaft, and permitting the wind turbine rotor to pivot in position relative to the rotor shaft a limited angular amount on both sides of a perpendicular position.

5. A wind powered system according to claim 4, comprising stop means within the hub for limiting the amount of angular movement of the wind turbine rotor relative to said rotor shaft.

6. A wind powered system according to claim 5, wherein the stop means permits about seven degrees of angular movement of the wind turbine rotor away from a perpendicular position relative to the rotor shaft.

7. A wind powered system according to claim 6, wherein the teeter means comprises a teeter shaft which is perpendicular to both the wind turbine rotor and said rotor shaft, and which is fixed in position with respect to the rotor shaft, and bearing means within the hub, between the hub and the opposite end portions of said teeter shaft, mounting the wind turbine rotor for rotation about the teeter shaft.

8. A wind powered system for generating electricity according to claim 7, wherein said bearing means comprises a pair of elastomeric members, one at each end of the teeter shaft, and mounting means for said elastomeric members carried by the hub of the wind turbine rotor.

9. A wind powered system according to claim 1, wherein each said blade comprises an outer end section of airfoil cross section having a front surface and a back surface;
 at least one of said fixed pitch outer end sections comprising a main portion including a leading edge for said section, and a drag brake forming, trailing edge portion having a generally triangular cross-sectional shape and an apex region; hinge means hinge-connecting said apex region to said main portion, for pivotal movement of the trailing edge portion relative to said main portion, between a retracted position in which it forms a streamline trailing edge for said outer end section and a deployed position in which it extends generally across the chord of the outer end section and functions as an aerodynamic drag brake, and
 said trailing edge portion having a first side surface which forms a part of said front surface when the trailing edge portion is retracted, and which extends generally laterally of said front surface when the trailing edge portion is deployed, and a second side surface which is concealed against the main portion when the trailing edge portion is retracted, and which extends generally laterally of the back surface when the trailing edge portion is deployed, and a base surface which is a part of the back surface when the trailing edge portion is retracted, and which extends generally laterally of the outer end section when the trailing edge portion is developed.

10. A wind turbine system according to claim 9, comprising linkage means housed within the main portion of the outer end section of the rotor, said linkage means having an outer end which is connected to the trailing edge portion at a location offset from the location of hinge connection of the trailing edge portion to the main portion, said linkage means being movable outwardly during deployment of the trailing edge portion to function as a drag brake, said linkage means serving to position the trailing edge portion.

11. A wind powered system for generating electricity, comprising:
- a support tower;
- a nacelle on top of the support tower;
- a step-up transmission within said nacelle having a low speed end and a high speed end;
- a rotary electric generator within said nacelle having a rotor with an input end which is connected to the high speed end of the transmission, said generator including means enabling it to operate as a generator at a plurality of discreet speeds of rotation;
- an input shaft having an inboard end connected with the low speed end of the transmission, and an outboard end;
- a wind turbine rotor comprising a hub and fixed pitch blades extending radially outwardly from said hub, said hub including means connecting it to the outboard end of said input shaft;
- each said blade having a fixed pitch mid-section of airfoil cross section and a fixed pitch outer end section of airfoil cross section;
- at least one outer end section including a main portion including a leading edge for said section, and a drag brake forming, trailing edge portion which is hinge-connected to said main portion, for movement between a retracted position in which it forms a streamline trailing edge for said outer end section and a deployed position in which it extends generally across the chord of the outer end section and functions as an aerodynamic drag brake;
- a centrifugal force triggered positioning means normally holding the drag brake in its retracted position, but operating in response to the development of a centrifugal force of than a predetermined magnitude to move said drag brake into its deployed position; and
- a releasable lock member having a lock position in which it locks the weight means in its inner position, and a centrifugal force operated trigger means for moving said lock member into an unlocked position in response to a centrifugal force of a predetermined magnitude, with said weight means being free to move radially outwardly from its inner position to its outer position, in response to centrifugal force, when the lock member is in its unlocked position.

12. A wind turbine system according to claim 11, comprising a drag brake of the type described, carried by each blade.

13. A wind turbine system according to claim 11, wherein said rotor hub has a central portion with no twist, and as it extends outwardly from the central portion of the hub, each blade twists to a maximum plus twist, then to a zero twist and then to a minus twist, and wherein the outer end section of each blade has a minus twist.

14. A wind turbine system according to claim 11, wherein the outer end sections of the blades are constructed from a lighter material than the remainder of the rotor, and said outer end sections are both thinner and narrower than the remainder of the rotor.

15. A wind powered system for generating electricity, comprising:
- a support tower;
- a nacelle on top of the support tower;
- a step-up transmission within said nacelle having a low speed end and a high speed end;
- a rotary electric generator within said nacelle having a rotor with an input end which is connected to the high speed end of the transmission, said generator including means enabling it to operate as a generator at a plurality of discreet speeds of rotation;
- an input shaft having an inboard end connected with the low speed end of the transmission, and an outboard end;
- a wind turbine rotor comprising a hub and fixed pitch blades extending radially outwardly from said hub, said hub including means connecting it to the outboard end of said input shaft;
- each said blade having a fixed pitch mid-section of airfoil cross section and a fixed pitch outer end section of airfoil cross section;
- at least one outer end section including a main portion including a leading edge for said section, and a drag brake forming, trailing edge portion which is hinge-connected to said main portion, for movement between a retracted position in which it forms a streamline trailing edge for said outer end section and a deployed position in which it extends generally across the chord of the outer end section and functions as an aerodynamic drag brake;
- a centrifugal force triggered positioning means normally holding the drag brake in its retracted position, but operating in response to the development of a centrifugal force of than a predetermined magnitude to move said drag brake into its deployed position;
- said positioning means for the drag brake comprising weight means mounted in the wind turbine rotor for radial translation between an inner position and an outer position, and linkage means interconnected between the weight means and the drag brake, said linkage means holding the drag brake in its retracted position when the weight means is in its inner position, and said linkage means holding the drag brake in its deployed position when the weight means is in its outward position;
- spring means for normally biasing the weight means radially inwardly, said spring means functioning to move the weight means from its outer position into its inner position when centrifugal force acting on said weight means drops below said predetermined magnitude; and
- a lock member for holding the weight means in its outer position, in opposition to the force of the spring means, and means for unlocking said lock member when the centrifugal force on the trigger mechanism drops below a predetermined magnitude, to free the weight means for inward movement.

16. A wind turbine system according to claim 15, comprising a drag brake of the type described, carried by each blade.

17. A wind turbine system according to claim 15, wherein said rotor hub has a central portion with no twist, and as it extends outwardly from the central portion of the hub, each blade twists to a maximum plus twist, then to a zero twist and then to a minus twist, and wherein the outer end section of each blade has a minus twist.

18. A wind turbine system according to claim 16, wherein the outer end sections of the blades are constructed from a lighter material than the remainder of the rotor, and said outer end sections are both thinner and narrower than the remainder of the rotor.

* * * * *